April 7, 1959    F. M. WOOD    2,881,387
PIPE INSPECTION
Filed March 8, 1954    2 Sheets-Sheet 1
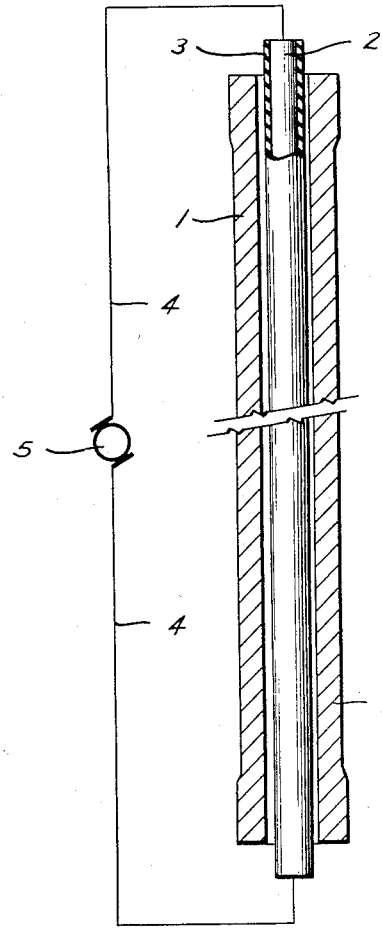
Fig. 1
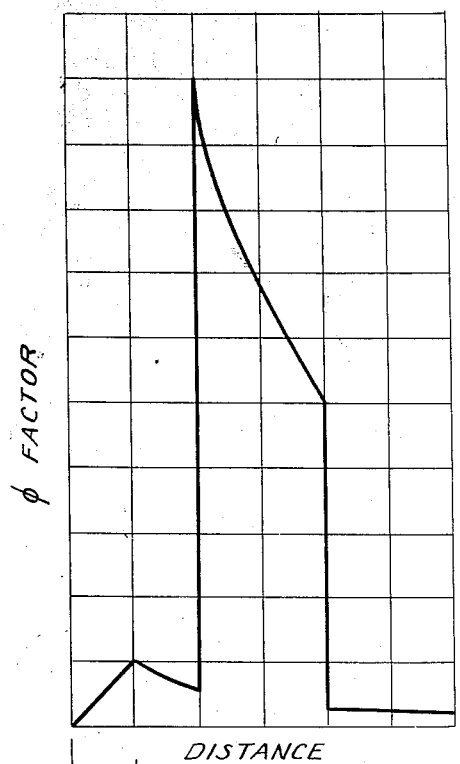
Fig. 2
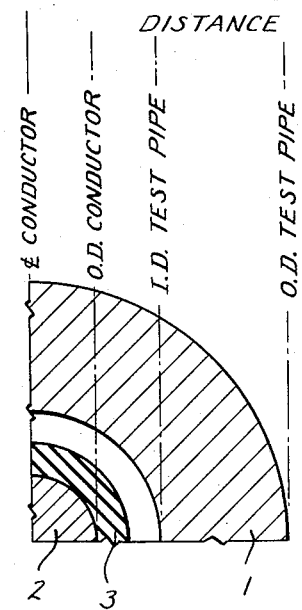
Fenton M. Wood
INVENTOR.
BY Thomas O Arnold
ATTORNEY April 7, 1959  F. M. WOOD  2,881,387
PIPE INSPECTION Filed March 8, 1954  2 Sheets-Sheet 2

Fenton M. Wood
INVENTOR.

BY Thomas O Arnold

ATTORNEY

United States Patent Office 2,881,387
Patented Apr. 7, 1959

2,881,387

PIPE INSPECTION

Fenton M. Wood, Houston, Tex., assignor to Tuboscope Company, Harris County, Tex., a corporation of Delaware Application March 8, 1954, Serial No. 414,844

11 Claims. (Cl. 324—37)

This invention relates to inductive electromagnetic pipe inspection methods and apparatus, and more particularly, to an improved means for and method of magnetizing pipe to be so inspected and improved pick up coils for use therewith.

Many articles of manufacture made of magnetic metals are inspected for flaws by passing a small coil over the surface of the article while it is magnetized, thereby inducing an electric signal in the coil responsive to fluctuations in the magnetic field surrounding the article, and observing by one indicator means or another the nature of those fluctuations. If there is a crack in the surface of such articles, the magnetic field surrounding the article adjacent such crack is distorted and induces a characteristic signal in the coil.

Heretofore, it has been impossible to obtain satisfactory indications of flaws not appearing on the surface of pipe over which the coil is moved. For example, if coils are moved over the external surface of the pipe, flaws within the pipe wall, or flaws on the internal surface of the pipe could not be satisfactorily and reliably detected and evaluated with pick up coils.

This invention concerns an improved manner of magnetizing pipe for this type of inspection, and improved coils particularly adapted for use with the new type of magnetization. When pipe is magnetized by surrounding it with a magnetizing coil, the flux concentration in the wall of the pipe is non-uniform from one end of the pipe to the other. Moreover, D.C. flux moves longitudinally of the pipe and is not substantially distorted by longitudinal cracks. Inspection for longitudinal flaws either on the inside or outside of the pipe is therefore impractical with this type of magnetization.

Other methods of magnetization of pipe are unsatisfactory in these or other particulars. For example, a magnetization which produces a flux concentration at the outside surface of the pipe, while not appreciably magnetizing the inside surface of the pipe does not afford opportunity to detect, with external pick up coils, cracks which may be on the inside surface of the pipe.

It is an object of this invention, therefore, to provide a new and novel means for and method of magnetizing pipe with circumferential flux for purposes of inductive electromagnetic inspection by passing a coil over the surface of the magnetized pipe.

Still another object of this invention is to provide improved means for and method of magnetizing pipe which will provide a high concentration of flux along the inside surface of the pipe, while at the same time providing a substantial concentration of flux throughout the wall of the pipe.

A further object of this invention is to provide pick up coils peculiarly adapted for use with this improved magnetization, whereby defects at any point in the pipe wall may be detected and evaluated.

Other objects are apparent from the following description and accompanying drawings.

These objects are accomplished, in accordance with this invention, by passing a large current through a conductor inside the pipe, and magnetizing the pipe with the flux produced by that current moving longitudinally of the pipe, and by providing pick up coils with selective detection characteristics.

The invention will be more clearly understood by referring to the accompanying drawings wherein:

Figure 1 is a schematic representation of the preferred magnetizing means.

Figure 2 is an illustration of typical flux patterns produced by this magnetizing means.

Figure 3:
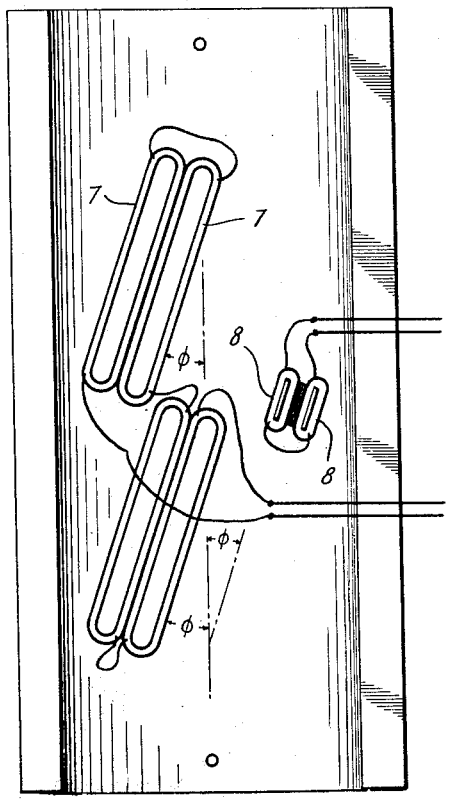
Figure 3 is a layout showing the bottom side of a pick up coil shoe, and depicting one pair of external pick up coils and two pairs of larger coils adapted to be responsive to both internal and external defects.

The joint of pipe 1 to be tested may be placed in any convenient position. A solid or tubular conductor or prod 2 is placed within the pipe. Preferably the prod 2 is slightly longer than the length of pipe, and is as large as it can be, without making its insertion into the pipe unduly difficult. The entire surface of the prod 2 may be covered with insulation 3. Each end of the prod 2 is adapted for connection by lines 4 to a source of electrode current 5.

The flux pattern produced by this method of magnetization when the prod is a nonmagnetic material, is illustrated in Figure 2. At the center of the prod, there is no flux, but the flux increases in relationship to the distance from the center of the prod. When the insulation and air gap are reached, the flux commences to fall off, but at the internal surface of the pipe, the flux immediately jumps up to a very high level, due to the greater magnetic permeability of the pipe. The flux density falls off toward the outside wall of the pipe, but is still substantial at the outside surface.

It should also be noted that the flux produced by this method is circumferential rather than longitudinal of the pipe, with the result that longitudinal defects produce large distortions in the flux pattern immediately adjacent the pipe.

When pick up coils are moved along the outside surface of magnetized pipe, flaws on the outside surface of the pipe may be detected relatively easily. When the coils are moved on the outside of the pipe, a flaw on the inside of the pipe is more difficult to detect. In accordance with this invention, the pipe carries a very high flux concentration on the inside surface of the pipe, at the position farthest removed from the coil on the outside of the pipe. And the pipe carries a moderate flux concentration intermediate the inside and outside walls, at intermediate distances from the pick up coil on the outside of the pipe. Hence, flaws appearing at any position in the pipe wall may be detected by a coil on the outside of the pipe, and the difference in magnitude of indications of internal flaws and indications of external flaws can be kept within reasonable bounds for amplification and recordation in the same equipment.

As the ring which a pebble makes when dropped into calm water is small when it is close to the pebble and large when it has moved some distance from the pebble, so the magnetic flux variation caused by a crack in magnetized pipe is small and concentrated close to the crack and large and less concentrated some distance from the crack. It is therefore apparent that an external crack in magnetized pipe will present to an external coil, a narrow concentrated flux variation, while an internal crack, being a greater distance from the external coil, will present a relatively broad and less concentrated flux variation to an external coil.

In order to take the fullest advantage of the method of magnetization hereinabove described, it is desirable to use a combination of coil types which pick up signals which are indicative of whether the flaw detected is internal or external.

In accordance with this invention, two distinct coil types are used in combination, and in combination with the above described method of magnetization. One coil type is relatively long and wide and without a core, while the other is relatively small and narrow and provided with a core. Both types may be noted in Figure 3.

All coils may be wound with an appropriate number of turns of #40 A.W.G. or small copper wire, or substantial equivalents thereto. 250 turns of #43 wire has been found to make satisfactory coils.

The large coils 7 may be on the order of two inches long, and 9/16 inch wide from the center of one side of the coil to the center of the other side, with about 3/32 inch space between the two sides of the coil. Preferably they are arranged in side by side pairs and are connected in series opposed.

Figure 5:
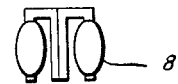
Figure 5 is an elevational detail of a preferred external pick up coil.
Figure 6:
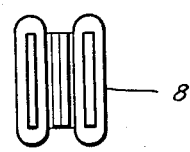
Figure 6 is a bottom view of an external pick up coil.
Figure 4:
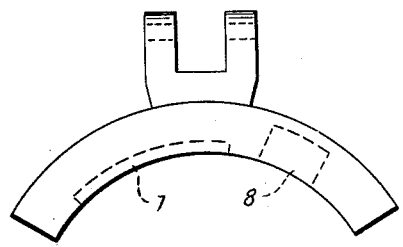
Figure 4 is an end view of a pick up shoe, illustrating its curvature to fit the pipe to be inspected.

Conveniently, the small coils may be wound in pairs, also connected series opposed, on the outside legs of an m-shaped, magnetically permeable, core about 1/4 inch high and 3/8 inch deep. See Figures 5 and 6. There may be about 1/16 inch between the legs of the m. The outside legs of the m may be about .03 inch thick; the middle leg may conveniently be twice as thick.

The larger coils detect the relatively less intense and broad flux variations produced by an internal defect. They also detect the small sized flux variations produced by external defects. The narrower and shorter cored coils are adapted to be responsive only to the sharper flux variations produced by external defects. Hence, if pairs of large coils and pairs of small coils are passed over the same defect, and both coils produce a response, the defect is external, while if only the long coil produces a response, the defect is internal. The large coils and the small coils are normally connected to different indicator means.

The side by side series opposed arrangement of pairs of coils is preferred so as to eliminate responses from longitudinal wall thickness variations which are better detected and evaluated with other apparatus. In new rolled pipe of any given I.D., O.D. and manufacturing practice, the defects form a fixed angle θ with the axis of the pipe. The detector coils are preferably set at this angle for maximum sensitivity to these defects. However, the small external coils on the core are not too sensitive to the variation in direction of the defects, and therefore can record such defects as quenching cracks as great as 45 degrees from the axis of the coils with very little attenuation.

Further, some pipe has a straight longitudinal hump which is not a defect, but which does affect the magnetic pattern of the pipe when magnetized. Response to this type of condition can be eliminated by using two pairs of coils, turned to the angle θ, each pair being positioned with respect to the other pair along the pipe axis. In this arrangement, the coils of each pair are connected series opposed, and the second coil of the lead pair and the lead coil of the following pair are connected in adding series. In this manner, the longitudinal hump engages two coils at the same time—two coils which oppose each other and which therefore produce no resultant indication of the hump.

Preferably the scanning of the pipe surface is accomplished by turning the pipe under the coil shoe, as the coil shoe is moved axially of the pipe. The trailing end of the lead pair of large coils and the leading end of the following pair of large coils overlap slightly so there is no gap in the scanning between them. Also, the rate of turning of the pipe and of advance of the coil shoe along the pipe is adjusted so that advance of the coil shoe per turn of pipe is less than the effective axial length of the two pairs of coils, thereby assuring complete scanning by the large coils.

In new normalized pipe, the only external defects commonly found are long spiral defects. Since it is not desired to cancel response to these defects, a single pair of external pick up coils is used. Since the defects are usually quite long, the short coil will normally pass over a part of each defect, even though the small coil does not scan 100% of the surface of the pipe. When heat treated pipe is being inspected, complete scanning by the external coils becomes desirable because of the frequent occurrence of small external cracks. A multiplicity of external coils connected to one or more indicator means, are then desirable.

It is apparent to those skilled in the art that modifications may be made in the invention as herein described in a preferred form, without departure from the scope of the invention. For example, a single large coil and a single small coil either without core, or wound on an n-shaped core may be used even though certain undesired responses are then obtained along with the desired response. Also, the coil arrangements described may be used with other methods of magnetization such as passing electric current through the pipe itself. Accordingly, the foregoing description is to be construed as illustrative only, and is not to be construed as any limitation upon the invention as defined in the following claims.

I claim:

1. Apparatus for electromagnetic inspection of pipe comprising the combination of means for magnetizing such pipe comprising an elongated prod made of a good conductor of electricity and adapted for insertion through said pipe, said prod being adapted for connection, external of said pipe, to a source of electric energy; and at least two coils adapted to be moved over the surface of said magnetized pipe, the first of said coils being substantially longer and wider than the second of said coils, said second coil being sufficiently short and narrow so as to be responsive only to the narrow patterns of flux variation produced by defects in the external surface of said pipe, said first coil being sufficiently long and wide to be responsive to broad patterns of flux variations produced by defects in the internal surface of said pipe.

2. Apparatus for the electromagnetic inspection of pipe comprising the combination of means for magnetizing such pipe comprising an elongated prod made of a good conductor of electricity and adapted for insertion through said pipe, said prod being adapted for connection external of said pipe to a source of electric energy; at least two pairs of coils adapted to be moved over the surface of said magnetized pipe, each of said first pair of coils being substantially identical and spaced equally from the surface of said magnetized pipe and being connected series opposed, each of said second pair of coils being substantially identical and spaced equally from the surface of said magnetized pipe and being connected series opposed, said second pair of coils being sufficiently short and narrow so as to be responsive only to narrow patterns of flux variation produced by defects in the external surface of said pipe said first pair of coils being sufficiently longer and wider than said second pair of coils so as to be responsive to broad patterns of flux variations produced by defects in the internal surface of said pipe.

3. The apparatus described in claim 2 wherein each of said second pair of coils is wound on one of the outside legs of an m-shaped core.

4. In apparatus for the electromagnetic inspection of pipe, the combination of means for magnetizing such pipe comprising an elongated prod made of a good conductor of electricity and adapted to be inserted through said pipe and to have the opposite ends thereof connected externally of said pipe to a source of electricity;

a first and second pair of substantially identical, relatively long and narrow coils; a third pair of substantially identical relatively shorter and narrower coils, each wound upon a generally m-shaped core of magnetically permeable material; the first coil of each pair of coils being connected in series opposition to the second coil of the respective pair of coils, and the second coil of said first pair being connected in adding series to the first coil of said second pair; means for positioning said coils at a predetermined angle with the axis of said pipe with said first pair of coils being positioned along the axis of said pipe with relation to said second pair of coils; means for moving said coils in a helical path over the surface of said pipe; and indicator means responsive to said first and second pair of coils and additional indicator means responsive to said third pair of coils.

5. In apparatus for the electromagnetic inspection of pipe, the combination of means for magnetizing such pipe, a first and second pair of substantially identical and relatively long and narrow coils; a third pair of substantially identical relatively shorter and narrower coils, each wound upon a generally m-shaped core of magnetically permeable material; the first coil of each pair of coils being connected in series opposition to the second coil of the respective pair of coils, and the second coil of said first pair being connected in adding series to the first coil of said second pair.

6. Apparatus for the electromagnetic inspection of magnetized pipe comprising the combination of at least two pairs of coils adapted to be moved over the surface of magnetized pipe, each of said first pair of coils being substantially identical and connected series opposed, each of said second pair of coils being substantially identical and connected series opposed, said first pair of coils being substantially longer and wider than said second pair of coils, said second coil being sufficiently short and narrow so as to be responsive only to narrow patterns of flux variation produced by defects in the external surface of said pipe, said first pair of coils being sufficiently long and wide so as to be responsive to broad patterns of flux variation produced by defects in the internal surface of said pipe.

7. The apparatus described in claim 6 characterized by each of said second pair of coils being wound on one of the outside legs of an m-shaped core.

8. The process of inspecting pipe comprising the steps of passing magnetic flux through the pipe in a direction generally circumferential of the pipe and with greater flux concentration on the inside of the pipe than on the outside thereof, inspecting the magnetic field adjacent the outside surface of said pipe in at least two areas which areas are moved progressively over the surface of the pipe in a generally helical pattern, one of said areas being relatively much smaller than the other.

9. The process of inspecting pipe comprising the steps of passing magnetic flux through the pipe in a direction generally circumferential of the pipe and with greater flux concentration on the inside of the pipe than on the outside thereof, inspecting the magnetic field adjacent the outside surface of said pipe in a small area moved progressively over such surface in a generally helical pattern for patterns of flux variation which are small and concentrated and simultaneously and separately inspecting the magnetic field adjacent the outside surface of said pipe in a large area moved progressively over such surface for patterns of flux variation which are relatively much more broad and less concentrated.

10. The process of inspecting pipe comprising the steps of passing magnetic flux through the pipe in a direction generally circumferential of the pipe and with greater flux density concentration on the inside of the pipe than on the outside thereof; inspecting the magnetic field adjacent the outside surface of said pipe progressively over such surface, such inspection being in at least a pair of adjacent relatively small areas and in at least two pairs of adjacent and markedly larger areas, the two areas of each pair being disposed with respect to each other in a direction circumferential of the pipe and the two areas of each pair extending over generally the same portion of the longitudinal dimension of the pipe, each pair of the larger areas extending also over generally the same portion of the circumferential dimension of the pipe as the other pair of larger areas.

11. In apparatus for the electromagnetic inspection of pipe, the combination of means for magnetizing such pipe comprising an elongated stiff and substantially straight prod capable of conducting electricity and adapted to be inserted through said pipe and to carry current unidirectionally through said pipe; a first and a second pair of substantially identical relatively long and narrow coils; a third pair of substantially identical relatively shorter and narrower coils, each wound upon a core of magnetically permeable material; the first coil of each pair of coils being connected in series opposition to the second coil of the respective pair of coils, and the second coil of said first pair being connected in adding series to the first coil of said second pair; means for positioning said coils at a predetermined angle with the axis of said pipe with said first pair of coils being positioned along the axis of said pipe with relation to said second pair of coils; means for moving said coils in a helical path over the surface of said pipe; and indicator means responsive to signals induced in said coils.

References Cited in the file of this patent

UNITED STATES PATENTS

| | | |
|---|---|---|
| 2,124,579 | Knerr et al. | July 26, 1938 |
| 2,158,409 | De Forest et al. | May 16, 1939 |
| 2,594,332 | McKee et al. | Apr. 29, 1952 |
| 2,650,344 | Lloyd | Aug. 25, 1953 |

FOREIGN PATENTS

| | | |
|---|---|---|
| 510,839 | Germany | Oct. 23, 1930 |